(12) United States Patent
Sivley, IV

(10) Patent No.: US 7,469,938 B2
(45) Date of Patent: Dec. 30, 2008

(54) THREADED CONNECTION ESPECIALLY FOR RADICALLY PLASTICALLY EXPANDABLE CONDUIT

(75) Inventor: Robert S. Sivley, IV, Kingwood, TX (US)

(73) Assignee: Hydril Company, Houston, TX (US)

( * ) Notice: Subject to any disclaimer, the term of this patent is extended or adjusted under 35 U.S.C. 154(b) by 160 days.

(21) Appl. No.: 11/201,865

(22) Filed: Aug. 11, 2005

(65) Prior Publication Data

US 2005/0285398 A1    Dec. 29, 2005

Related U.S. Application Data

(62) Division of application No. 10/126,918, filed on Apr. 19, 2002, now Pat. No. 6,976,711.

(51) Int. Cl.
    *F16L 15/00* (2006.01)

(52) U.S. Cl. .................... 285/390; 285/334

(58) Field of Classification Search .......... 285/390, 285/355, 333, 334
See application file for complete search history.

(56) References Cited

U.S. PATENT DOCUMENTS

| RE30,647 E * | 6/1981 | Blose ............... 285/334 |
| 4,582,348 A * | 4/1986 | Dearden et al. ...... 285/390 |
| 6,158,785 A * | 12/2000 | Beaulier et al. ..... 285/334 |
| 6,206,436 B1 * | 3/2001 | Mallis .............. 285/334 |

* cited by examiner

*Primary Examiner*—Aaron M Dunwoody
(74) *Attorney, Agent, or Firm*—Osha Liang LLP

(57) ABSTRACT

A threaded connection includes a male member having threads thereon defining a load flank lead and a stab flank lead. The threaded connection also includes a female member having threads thereon adapted to mate with threads on the male member, wherein the threads on the female end define a load flank lead and a stab flank lead, wherein at least one of the load flank lead and the stab flank lead on at least one of the female member and the male member change at a predetermined rate beginning at a selected distance from either one or both ends of the threads, wherein the stab flank lead and the load flank lead are different from each other over at least part of the thread length.

4 Claims, 15 Drawing Sheets

US 7,469,938 B2

THREADED CONNECTION ESPECIALLY FOR RADICALLY PLASTICALLY EXPANDABLE CONDUIT

CROSS-REFERENCE TO RELATED APPLICATIONS

The present application is a divisional application claiming the benefit of U.S. patent application Ser. No. 10/126,918 entitled "Threaded Connection Especially for Radially Plastically Expandable Conduit," filed on Apr. 19, 2002.

STATEMENT REGARDING FEDERALLY SPONSORED RESEARCH OR DEVELOPMENT

Not applicable

BACKGROUND OF INVENTION

1. Field of the Invention

The invention relates generally to threaded connections used for couple segments of pipe. More specifically, the invention relates to structures for threaded connections that may be used particularly in radially, plastically expandable tubes or pipes.

2. Background Art

Threaded tubular connections are used for joining segments of conduits or pipes end-to-end to form a continuous conduit or pipe for transporting fluid under pressure. Oilfield tubular goods, such as casing, generally use such threaded connections for connecting adjacent sections of conduit or pipe. Examples of such threaded connections designed for use on oilfield tubular goods are disclosed in U.S. Pat. Nos. 2,239,942; 2,992,019; 3,359,013; RE 30,647; and RE 34,467.

In U.S. Pat. No. RE 30,647 issued to Blose, a particular thread form or structure is disclosed for a tubular connection that provides an unusually strong joint while controlling the stress and strain in connected "pin" (male thread) and "box" (female thread) members to within acceptable levels. The pin member has at least one generally dovetail-shaped external thread whose width increases in one direction along the pin, while the box member has at least one matching generally dovetail-shaped internal thread whose width increases in the other direction. The mating set of dovetail-shaped threads provide a wedge-like engagement of opposing pin and box thread flanks that limit the extent of relative rotation between the pin and box members, and define a forcible make-up condition that completes the connection. In this thread structure, the angles of the flank shoulder, as well as the thread width, can be used to control the stress and strain preload conditions induced in the pin and box members for a given make-up torque. Thus, by tailoring the thread structure to a particular application or use, the tubular connection or joint is limited only by the properties of the materials selected.

A prior art tubular threaded connection includes a pin member and a box member. The box member has a tapered, internal, in many cases generally dovetail-shaped thread structure formed thereon which is adapted for engaging complementary tapered, external, thread structure formed on the pin member to mechanically secure the box and pin members in a releasable manner.

Internal thread on the box member has stab flanks, load flanks, roots, and crests. The internal thread increases in width progressively at a uniform rate in one direction over substantially the entire helical length of thread. External thread on the pin member has stab flanks, load flanks, roots, and crests. The external thread increases in width progressively at a uniform rate in the other direction, over substantially the entire length of the external thread. The oppositely increasing thread widths, and the taper of threads cause the complementary roots and crests of the respective threads and to move into engagement during make-up of the connection in conjunction with the moving of complementary stab and load flanks into engagement upon make-up of the connection.

The pin member or the box member defines the longitudinal axis of the made-up connection. The roots and crests of the box and pin members in some cases are flat and parallel to the longitudinal axis of the connection and have sufficient width to prevent any permanent deformation of the threads when the connection is made up.

An important part of any connection is a seal for keeping the conduit fluid pressure-tight at the connections. Typically connections will be designed to include metal-to-metal seals therein. Metal-to-metal seals have the advantage of not requiring gaskets or other additional sealing devices, which would typically have to be replaced periodically as the connections are coupled and uncoupled. Metal seals are created when contact pressure between two metal surfaces exceeds the fluid pressure to be sealed. Typically the contact pressures are created during make up of the connection. Some types of metal to metal seal are energized by internally pressurizing the conduit.

More recently, oilfield tubular goods have been developed which can be plastically radially expanded from their initial diameters after being installed for the intended application. See for example, R. D. Mack et al, *How in situ expansion affects casing and tubing properties*, World Oil, July 1999, Gulf Publishing Co., Houston, Tex., for a description of radially expandable oilfield tubular goods. Radially expandable tubular goods have particular application as casing in oil and gas producing wells. It has been difficult to seal radially expandable tubular connections using metal-to-metal seals known in the art.

It has also been determined that conventional threaded connections, including the previously described variable width threads, undergo large changes in distribution of stresses when such couplings are radially, plastically expanded. It is desirable to have a threaded connection which can maintain strength and sealing ability even after plastic radial expansion. It has also been determined that threaded connections such as the previously described variable thread width connections may have uneven stress distribution when the connection undergoes substantial compressive or tensile stress. It is therefore desirable to have a threaded connection which is better able to resist tensile and compressive stresses.

SUMMARY OF INVENTION

One aspect of the invention is a threaded connection for a radially, plastically expandable conduit. The threaded connection includes a male member having threads on it which define a load flank lead, a stab flank lead and a nominal lead. A female member has threads on it that are adapted to mate with the threads on the male member. The threads on the female member also define a load flank lead, a stab flank lead and a nominal lead. At least one of the load flank lead and the stab flank lead, on at least one of the female member and the male member, are varied at a predetermined rate beginning at a selected distance from an end of the threads. The load lead and the stab lead are different from each other over at least part of the thread length.

In one embodiment, the load flank lead, the nominal lead and the stab flank lead are each changed at a corresponding rate at the selected distance from at least one corresponding thread end on the male member and the female member.

In one embodiment, the stab flank lead is decreased at a nose of the male member and the stab flank lead is decreased at the thread base of the female member. The stab flank lead is substantially equal to the nominal lead at the nose of the male member and at the thread base of the female member. In one specific variation of this embodiment, the load flank lead is increased at a thread base of the male member and the load flank lead is increased at an open end of the female member. The load flank lead is substantially equal to the nominal lead at the base of the male member and at the open end of the female member.

In some embodiments, the stab lead is decreased and the load lead is increased near a first engaged thread on both the male member and the female member, and the load lead is decreased and the stab lead is increased near a last engaged thread on both the female member and the male member.

In some embodiments, near a first engaged thread on both the female member and the male member, the load lead and the stab lead are increased.

In some embodiments, on the male member the load lead is reduced near a last engaged thread thereof, and on the female member, the stab lead is increased near a last engaged thread thereof.

In some embodiments, the change in lead is linear. In some embodiments, the selected distance is about two threads.

Other aspects and advantages of the invention will be apparent from the following description and the appended claims.

DETAILED DESCRIPTION

In its most general terms, the invention is a threaded connection particularly suited for use in radially, plastically expandable conduit, or in some embodiments may be particularly suited for use in applications where the connection is expected to undergo substantial tensile or compressive stress. Embodiments of the invention include a type of thread known by the trademark "Wedge Thread." "Wedge Thread" is a trademark of Hydril Company, Houston, Tex., the assignee of the present invention, for threaded connections having a load flank lead which is different from the stab flank lead.

Figure 1A:
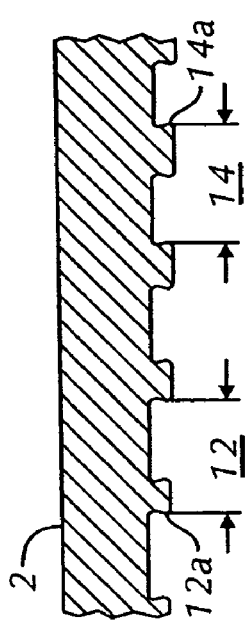
FIG. 1A shows a cut away view of one side of a female end of a threaded connection.
Figure 1B:
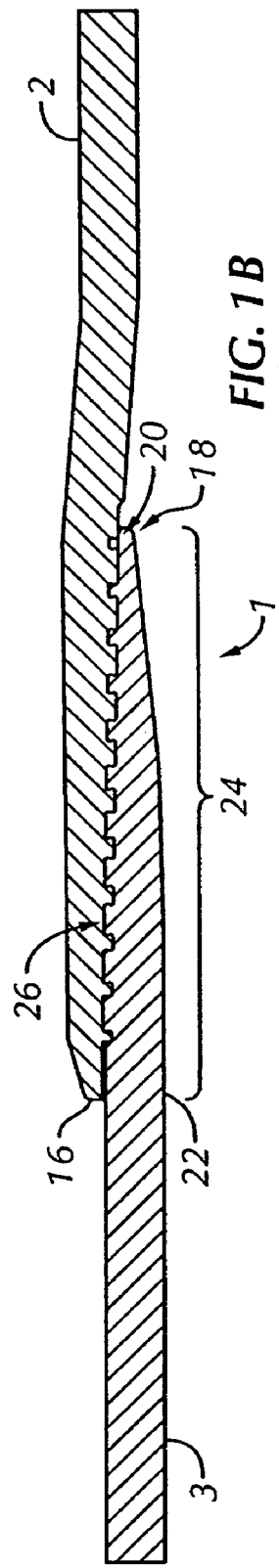
FIG. 1B shows a cut away view of a male end and a female end of one side of a threaded connection, as the ends are joined or "made up".

FIG. 1B shows a cut away view of a male member (pin) 3 coupled to a female member (box) 2 of a threaded connection 1 as the pin 3 and box 2 are joined. Only one side of the connection 1 (with respect to the centerline or longitudinal axis of the connection) is shown for clarity, the other side would thus be a mirror image of the side shown in FIG. 1B. The pin 3 terminates at a pin nose 18, and begins at a pin thread base 22. A distance 24 between the pin nose 18 and the thread base 22 is known as the thread length 24. Between the nose 18 and the thread base 22 are threads 26. In the example shown in FIG. 1B, the threads 26 are generally dovetail shaped. As will be further explained, other types of threads are also suitable for use in a threaded connection according to the invention.

The box 2 terminates in an open box end 16, and starts at a box thread base 20. Between the box thread base 20 and the box end 16, the inner surface of the box 2 includes threads 26 which are adapted to mate with the threads 26 on the pin 3.

A characteristic of threads used in various embodiments of the invention is that the "lead" of the threads is generally different on one thread flank than on the other thread flank. FIG. 1A shows the section of the box 2 of FIG. 1B in more detail. The threads each include a stab flank 12A and a load flank 14A. A distance, along the longitudinal axis of the connection, between each successive stab flank 12A, shown at 12 is referred to as the stab flank lead, or stab lead. The distance between each successive stab flank 12A is generally defined as the axial span (distance along the longitudinal axis of the pin or box) between corresponding points on successive threads at the same angular position around the circumference of the box 2. A similar definition applies to the load lead 14. In threaded connections according to the invention, the stab lead 12 is different than the load lead 14 by a selected amount known as the wedge ratio. As will be further explained, the wedge ratio is maintained at the selected amount up to a selected position from either or both ends of the threads in various embodiments of the invention. A "nominal" or "mid-lead" is a value mid way between the stab lead 12 and the load lead 14.

Figure 1C:
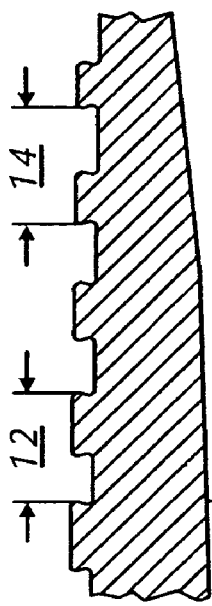
FIG. 1C shows a cut away view of a male end of one side of a threaded connection.

Similar definitions of stab lead 12 and load lead 14 apply to the corresponding load flanks and stab flanks on the pin threads. The load and stab leads on the pin are shown in more detail in FIG. 1C at 12 and 14, respectively for the stab and load leads. Typically, the threaded connection (1 in FIG. 1B) will be tapered. Tapered in this description means the diameter of the inner surface of the box 2 and the diameter of the outer surface of the pin 3 will change with respect to the axial position along the thread length (24 in FIG. 1B). The general construction and operation of the threaded connection 1 shown in FIG. 1B is known in the art, and is described, for example, in U.S. Pat. No. RE 30,647 issued to Blose, and is also generally described in the Background section herein.

Figure 2:
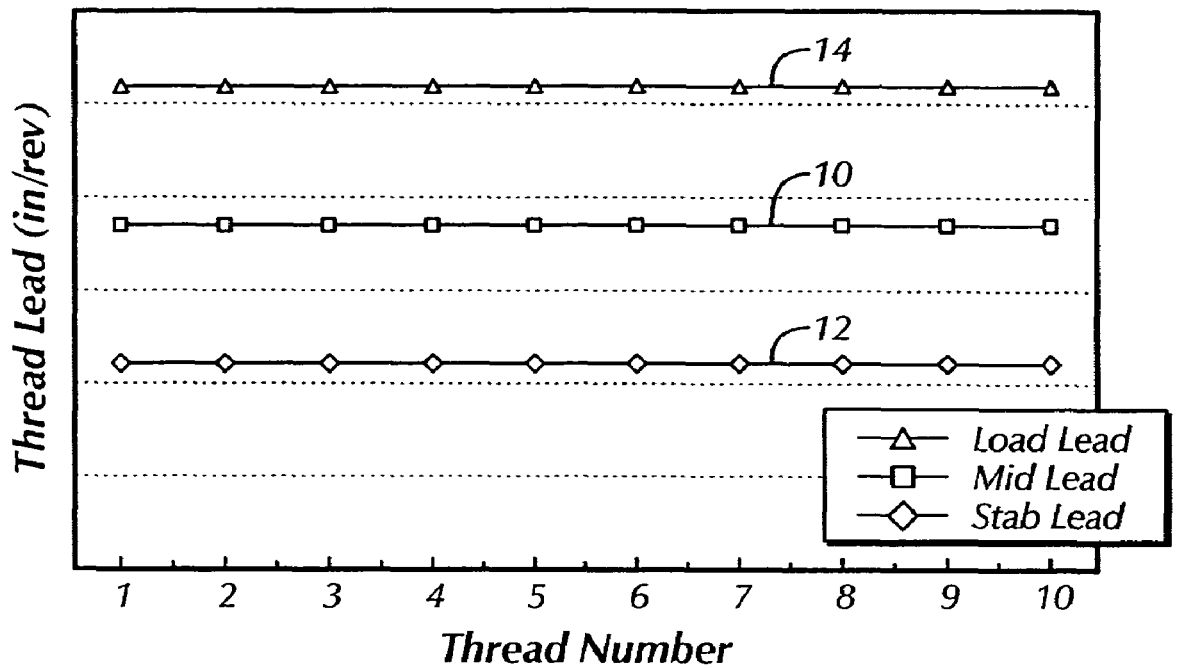
FIGS. 2 through 20 are graphs of stab lead, load lead and nominal lead for exemplary embodiments of a threaded connection according to the invention.

An example of a typical differential lead thread known in the art for a threaded connection is shown graphically in FIG. 2. The graph in FIG. 2 shows lead on the stab flanks of the thread at 12, the nominal or mid-lead at 10, and the load flank lead at 14. The coordinate axis of the graph indicates the engaged thread number of the member (pin or box), starting at the open end of the member and ending at the thread base end of that member. For example, thread number 1 represents the first engaged thread proximate the nose end of the pin (male member—nose shown at 18 in FIG. 1B) or the first engaged thread proximate the open end of the box (female member—open end shown at 16 in FIG. 1B). Thread number 10 would thus be near the thread base of the pin (22 in FIG. 1B), or near the thread base end of the box (20 in FIG. 1B). Differential lead threads known in the art include a stab lead 12 which is substantially constant over the entire thread length (24 in FIG. 1B) of the threaded connection, and a load lead 14 which is also substantially constant over the thread length. The load lead 14 differs from the stab lead 12 by a substantially constant amount referred to as the "wedge ratio." The nominal lead 10 is the midpoint between the stab lead 12 and the load lead 14.

Figure 3:
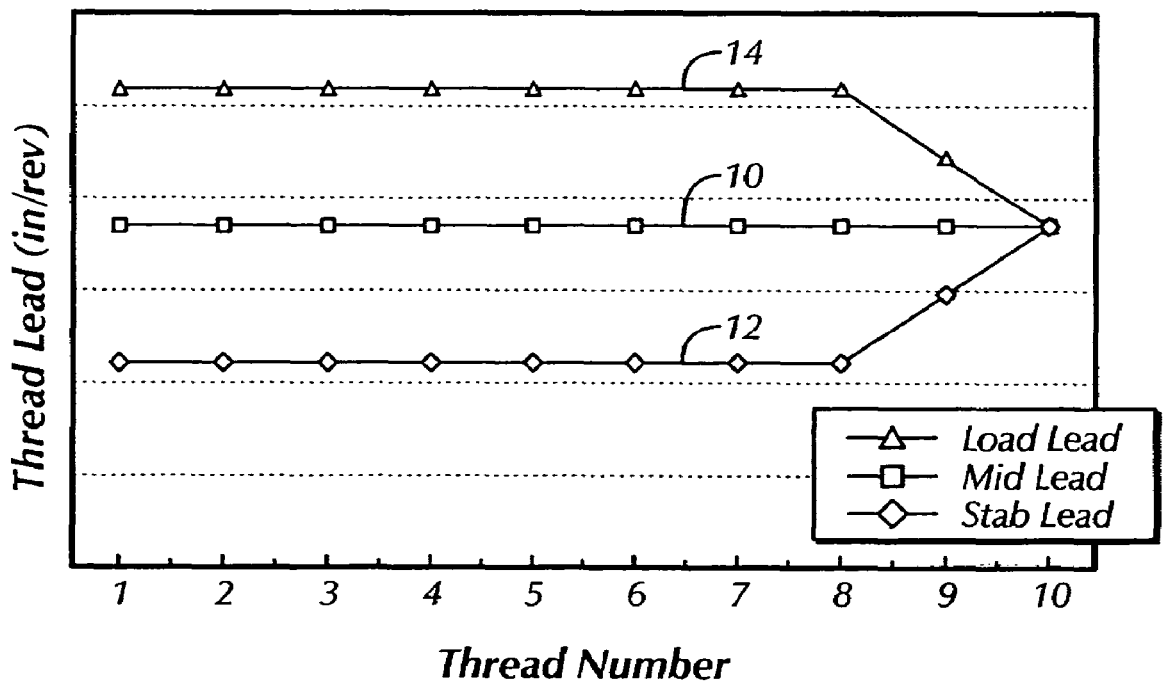

A first example of a threaded connection according to the invention is shown in FIG. 3, wherein the stab lead 12 is increased from its original value, beginning about two threads from the thread base of the connection, to a higher value at the thread base end of the connection. In one specific embodiment, the stab lead 12 will be changed on both the pin and the box at the thread base ends of each of the pin and the box, however, it is to be clearly understood that the scope of the invention includes having the stab flank lead changed on only one of the pin or box members according to the graph in FIG. 3.

In the embodiment of FIG. 3, the load lead 14 is decreased, starting at about the same axial position along the thread length (24 in FIG. 1B) as the change in the stab lead 12, namely about two threads from the thread base, on the same member as the increase in the stab lead 12. In this example, the size of the change in the load lead 14 is substantially the same as the size of the change in the stab lead 12. This results in a substantially constant nominal lead 10 over the entire thread length of the particular member for the member on which the leads 12, 14 are changed. Just as is the case for the change in the stab lead 12, the change in the load lead 14 is preferably made near the thread base of both the pin and the box, but may be made on only one of the pin or box members.

Figure 4:
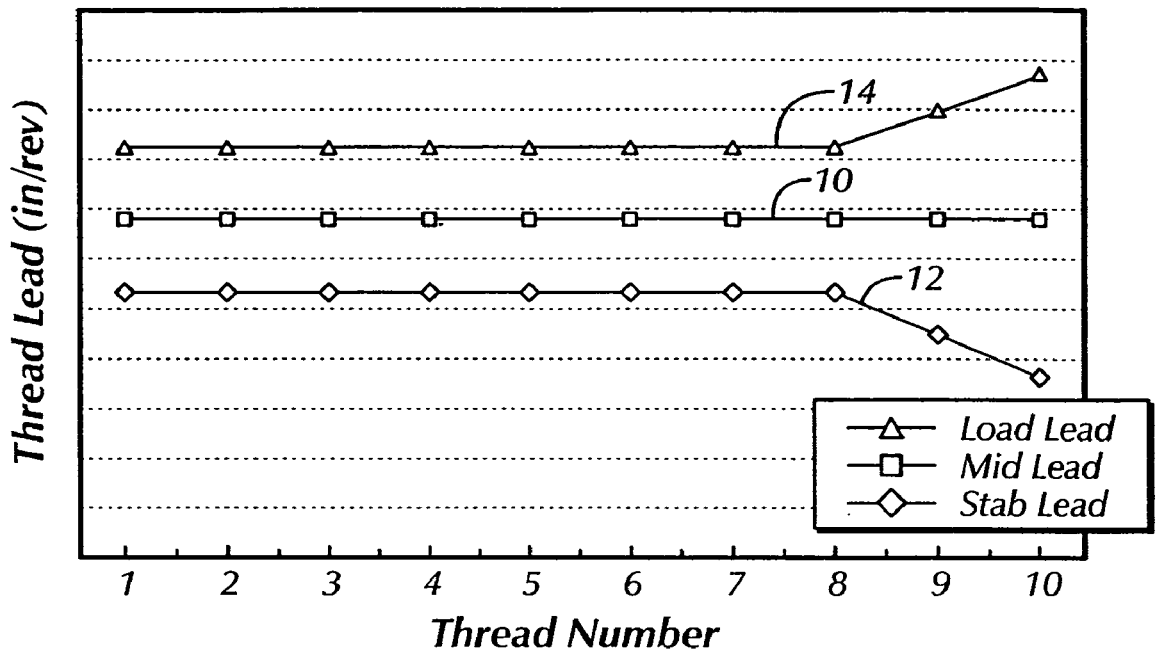

Another example of a threaded according to the invention is shown graphically in FIG. 4. In this embodiment, the stab lead 12 is decreased starting at about two threads from the thread base end of the connection. The load lead 14 is increased correspondingly starting at about the same axial position, so that the nominal lead 10 remains substantially constant over the entire threaded connection. As in the previous embodiment, the change in stab and load leads may be made near the thread base of either or both the pin and box members.

Figure 5:
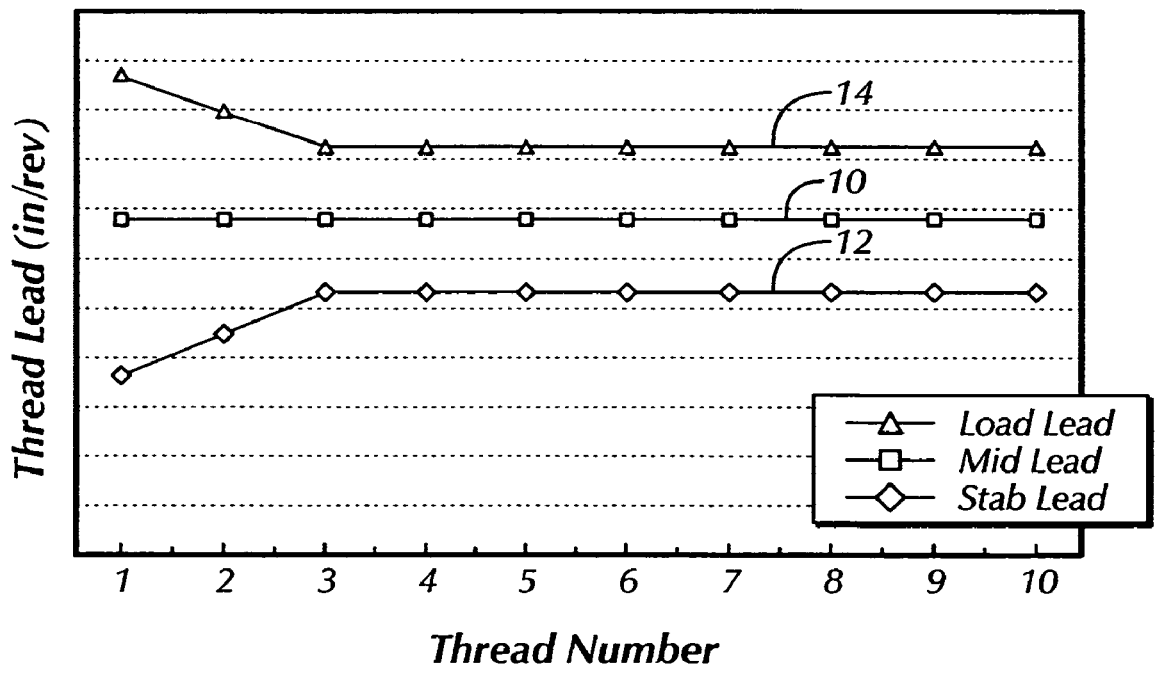

Another embodiment is shown graphically in FIG. 5. This embodiment is similar to the embodiment of FIG. 4, except that the load lead 14 and stab lead 12 are changed near the open thread end (first engaged thread) of the threaded connection. The embodiment of FIG. 5 also has a substantially constant nominal lead 10 over the entire threaded connection. As in the previous embodiments, the change in the stab 12 and load 14 leads may be made near the open thread end of either or both the pin and box members.

Figure 6:
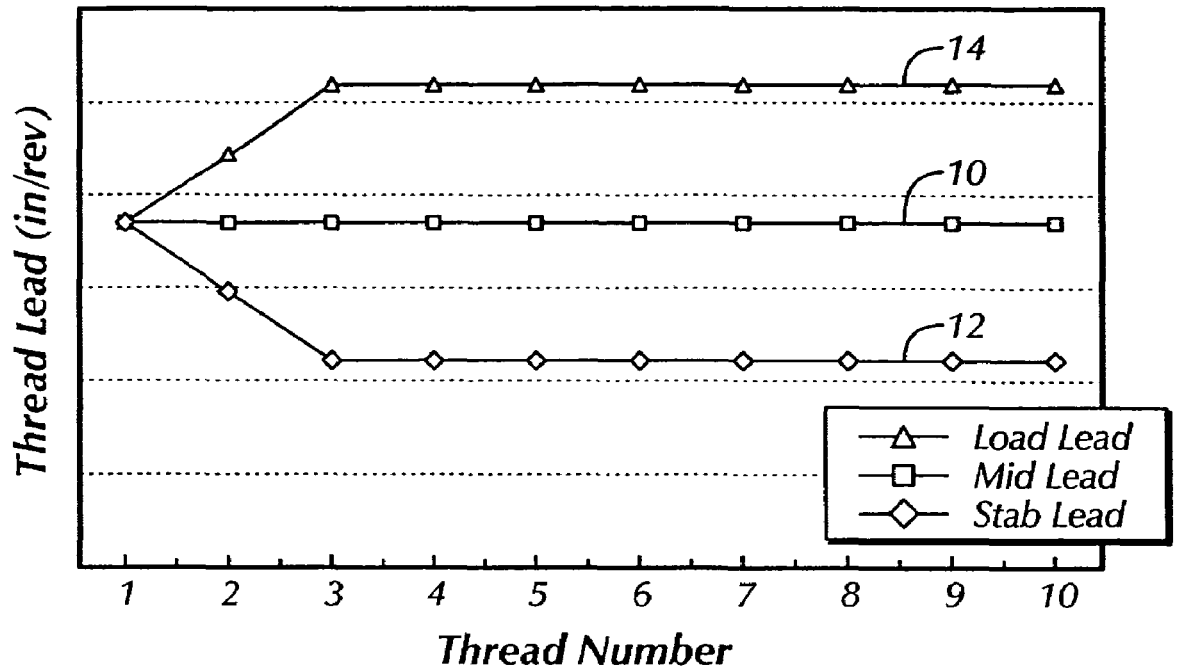

Another embodiment, shown graphically in FIG. 6, is similar to the embodiment shown in FIG. 3, the difference being that the stab lead 12 and the load lead 14 are changed near the open thread end (first engaged thread) of the threaded connection. The embodiment of FIG. 6 also has a substantially constant nominal lead 10 over the entire threaded connection. As in the previous embodiments, the change in the stab and load leads may be made on either or both the pin and box members.

Figure 7:
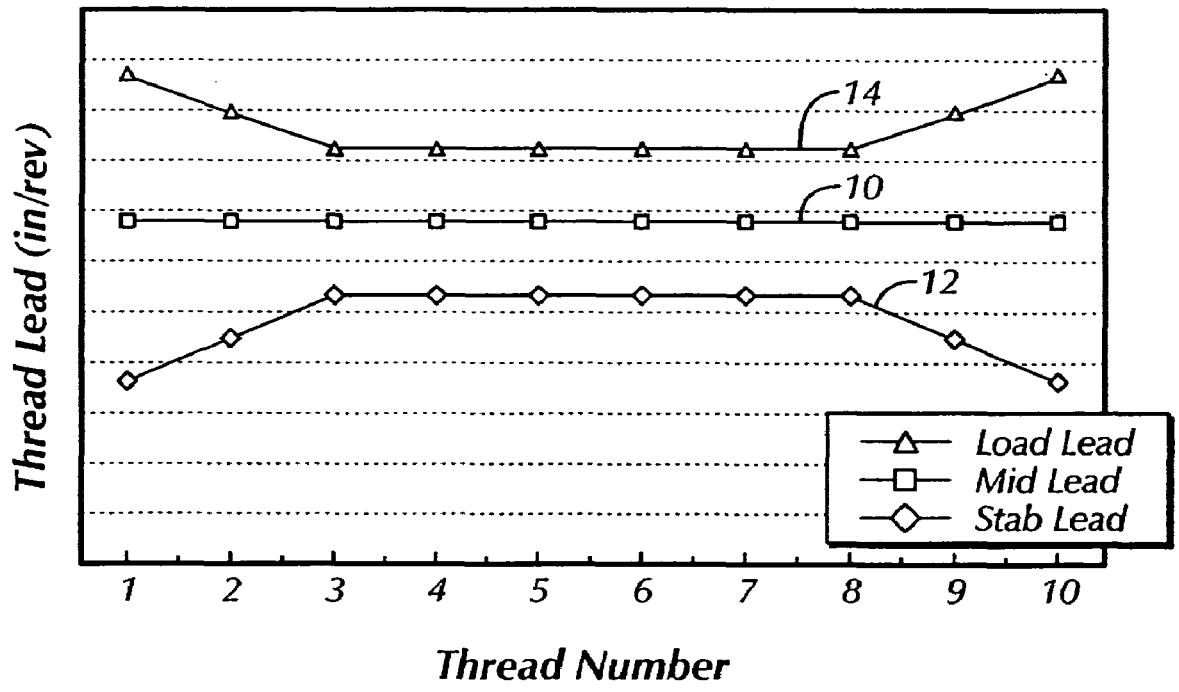

A different embodiment of the threaded connection is shown graphically in FIG. 7. This embodiment includes changes in stab lead 12 and load lead 14 similar to those shown in both FIGS. 4 and 5. In the embodiment of FIG. 7, a change in the stab and load leads 12, 14 is made near both ends of the threaded connection. The embodiment of FIG. 7 also has a substantially constant nominal lead 10 over the entire threaded connection. As in the previous embodiments, the change in the stab and load leads may be made on either or both the pin and box members.

Figure 8:
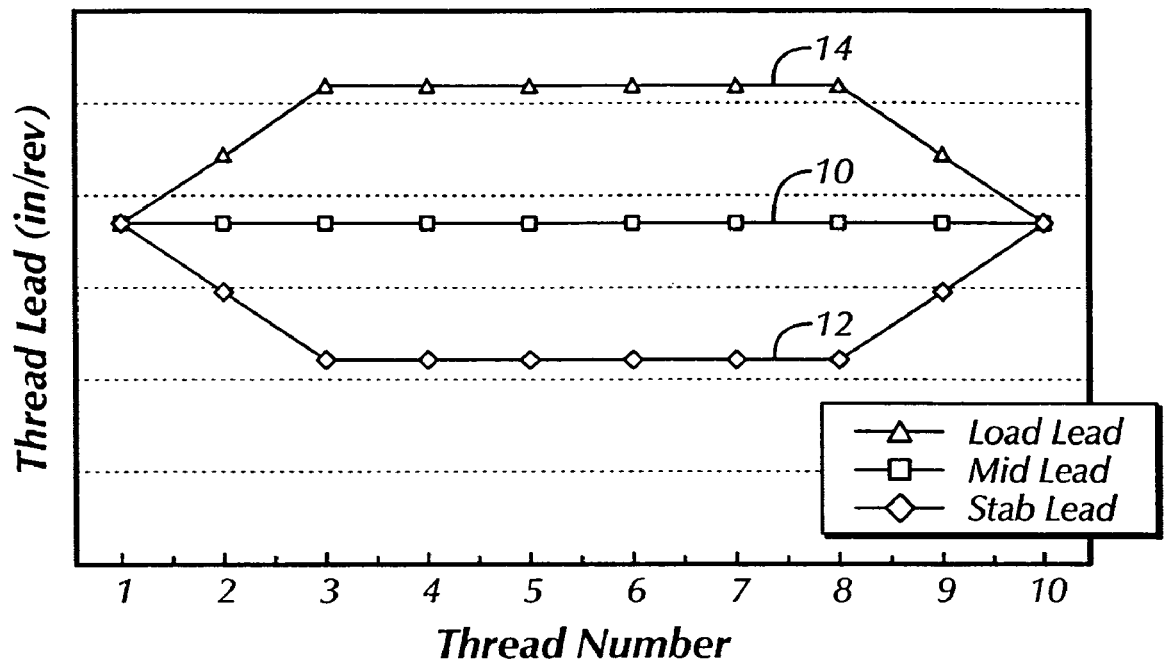

Yet another embodiment is shown graphically in FIG. 8. In this embodiment, the stab lead 12 and the load lead 14 are changed near both ends of the threaded connection, in a manner which essentially combines the lead changes of the embodiments of FIGS. 3 and 6. This means the load 14 and stab 12 leads are changed at both ends of the connection. The embodiment of FIG. 8 also has a substantially constant nominal lead 10 over the entire threaded connection. As in the previous embodiments, the change in the stab and load leads may be made on either or both the pin and box members.

Figure 9:
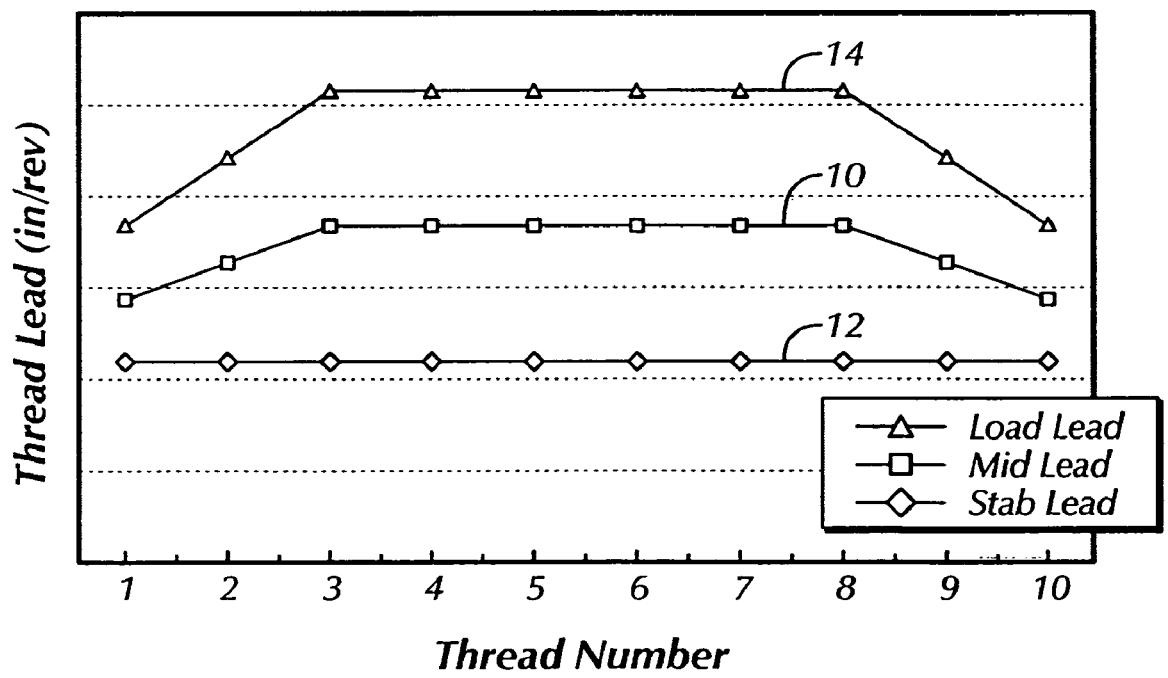

A different type of threaded connection according to the invention is shown graphically in FIG. 9. In this embodiment, the stab lead 12 is substantially constant over the entire threaded connection. The load lead 14 is decreased near each end of the connection starting at about two threads from each end. Notably, the nominal lead 10 changes when the load lead 14 is changed but the stab lead 12 is constant. As in the other embodiments described herein, the change in lead is preferably made in corresponding (mating) positions on the threads of both the pin and box parts of the threaded connection, but may be made on only one of the pin or box members.

Figure 10:
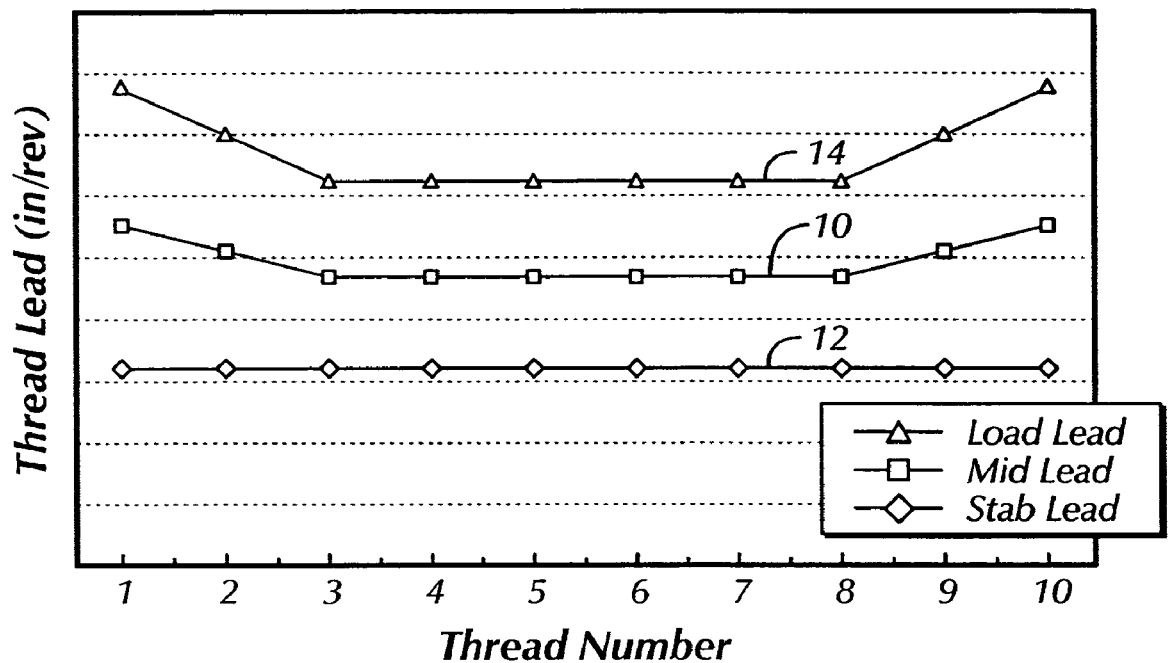

FIG. 10 shows a variation of the embodiment shown in FIG. 9. In this embodiment, the load lead 14 is increased at about the same position at each end of the threaded connection. The stab lead 12 is substantially constant in this embodiment. As in the previous embodiments, the change in the stab 12 and load 14 leads may be made on either or both the pin and box members.

Figure 11:
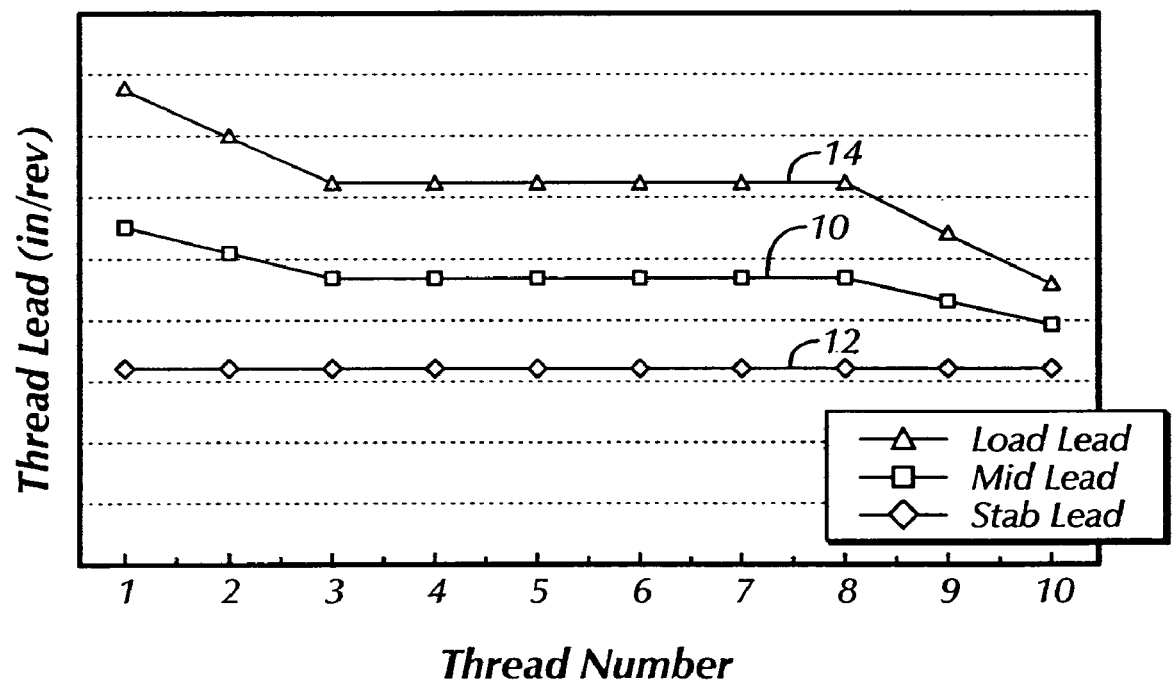
Figure 12:
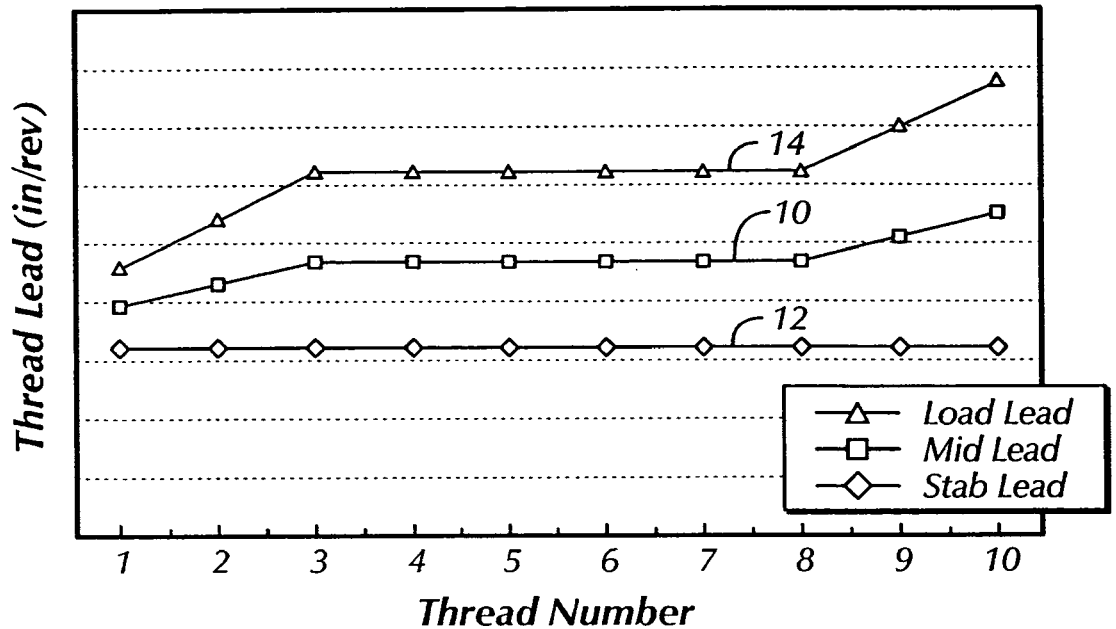

Another embodiment of a threaded connection according to the invention is shown in FIG. 11. In this embodiment, the load lead 14 is increased near the open end of the connection and is decreased at the thread base end. The stab lead 12 is substantially constant over the entire threaded connection. A variation of the embodiment of FIG. 11 is shown in FIG. 12. In FIG. 12, the load lead 14 changes at the opposite ends of the connection as compared with the embodiment of FIG. 11. As in the previous embodiments, the change in the stab 12 and load 14 leads may be made on either or both the pin and box members.

Figure 13:
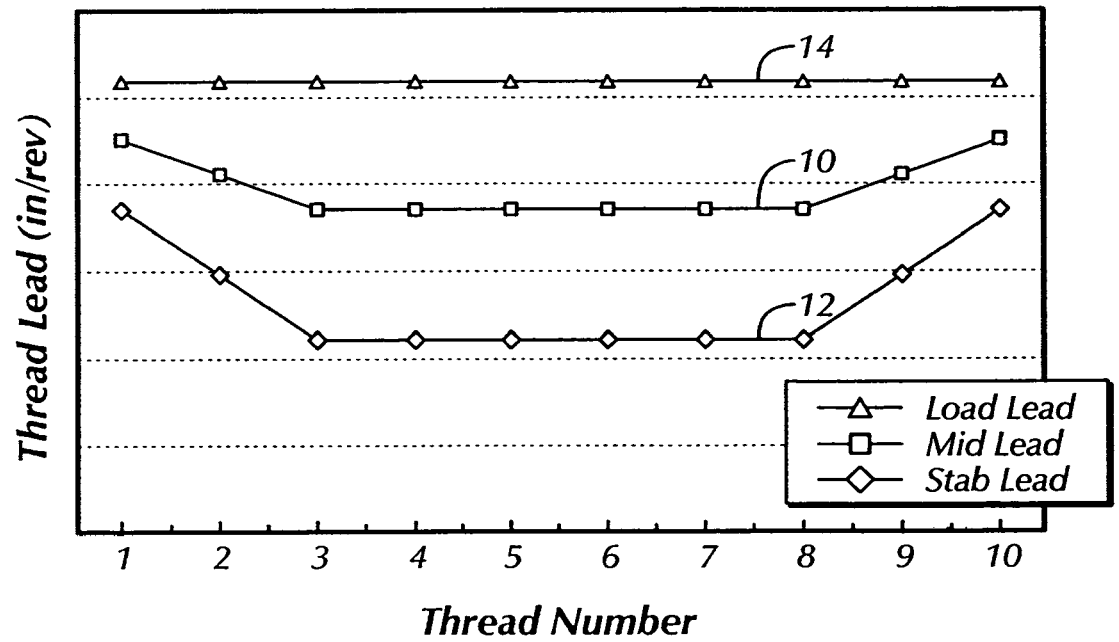
Figure 14:
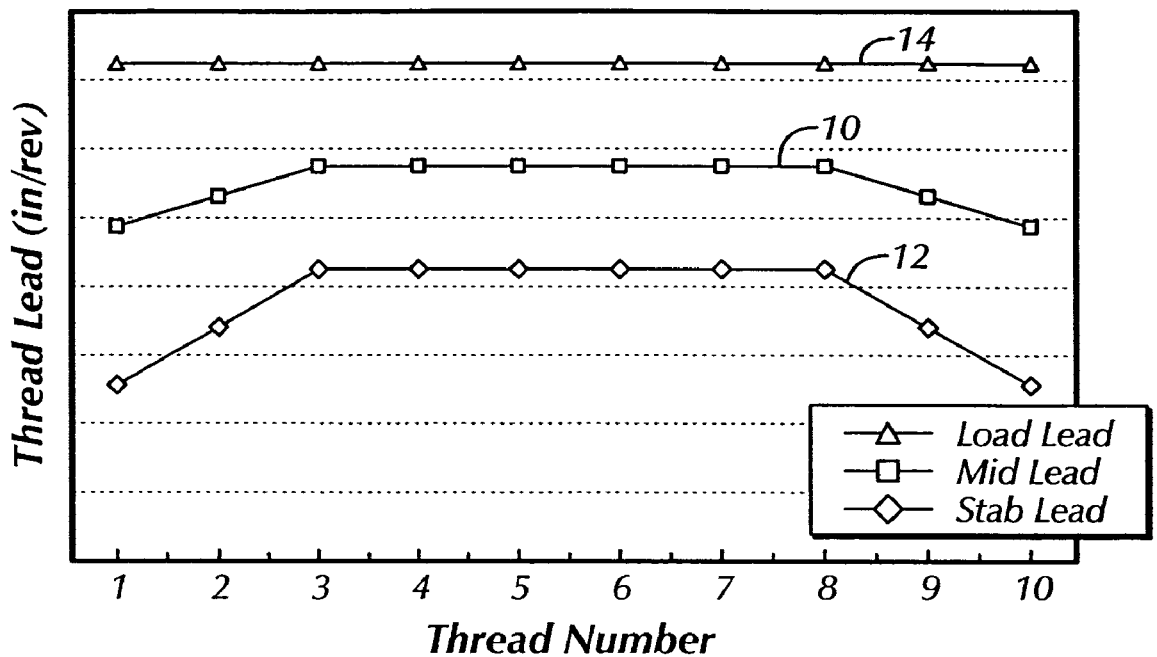
Figure 15:
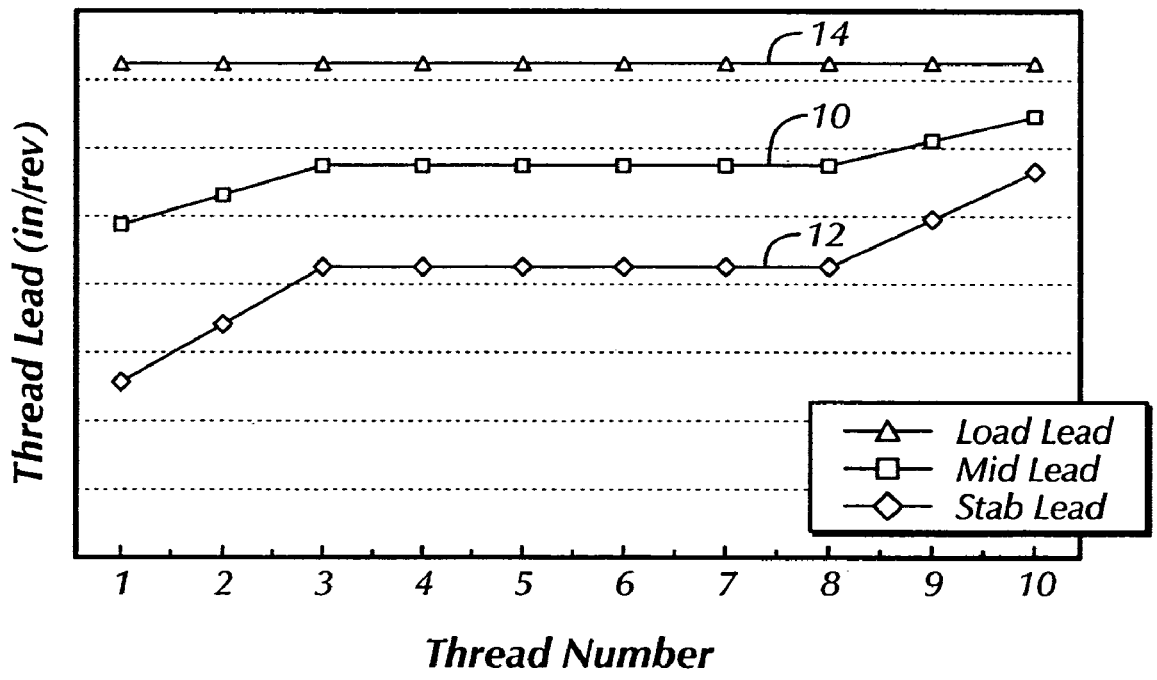
Figure 16:
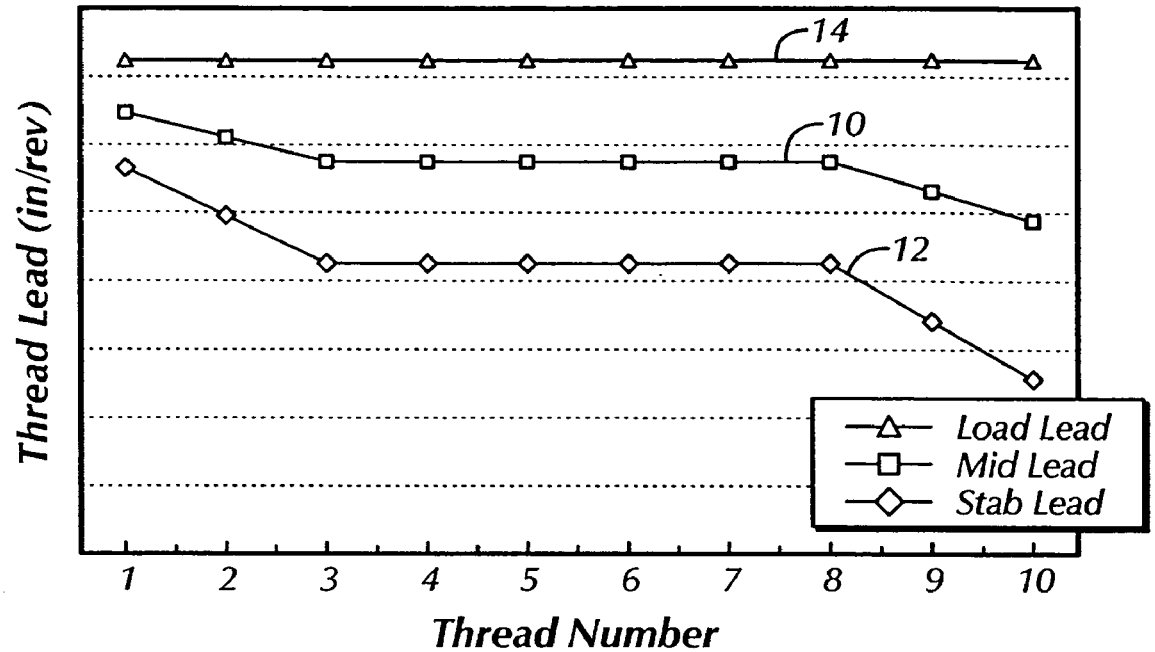

An embodiment shown in FIG. 13 is similar to the embodiment of FIG. 10, but in this embodiment, the stab lead 12 is increased at each end of the connection, while the load lead 14 is substantially constant. Embodiments of the threaded connection according to the invention which have changed stab lead 12, corresponding to the changed load lead 14 of the embodiments shown in FIGS. 9, 11 and 12, are shown in FIGS. 14, 16 and 15, respectively. As in the previous embodiments, the change in the stab and load leads may be made on either or both the pin and box members.

Figure 17:
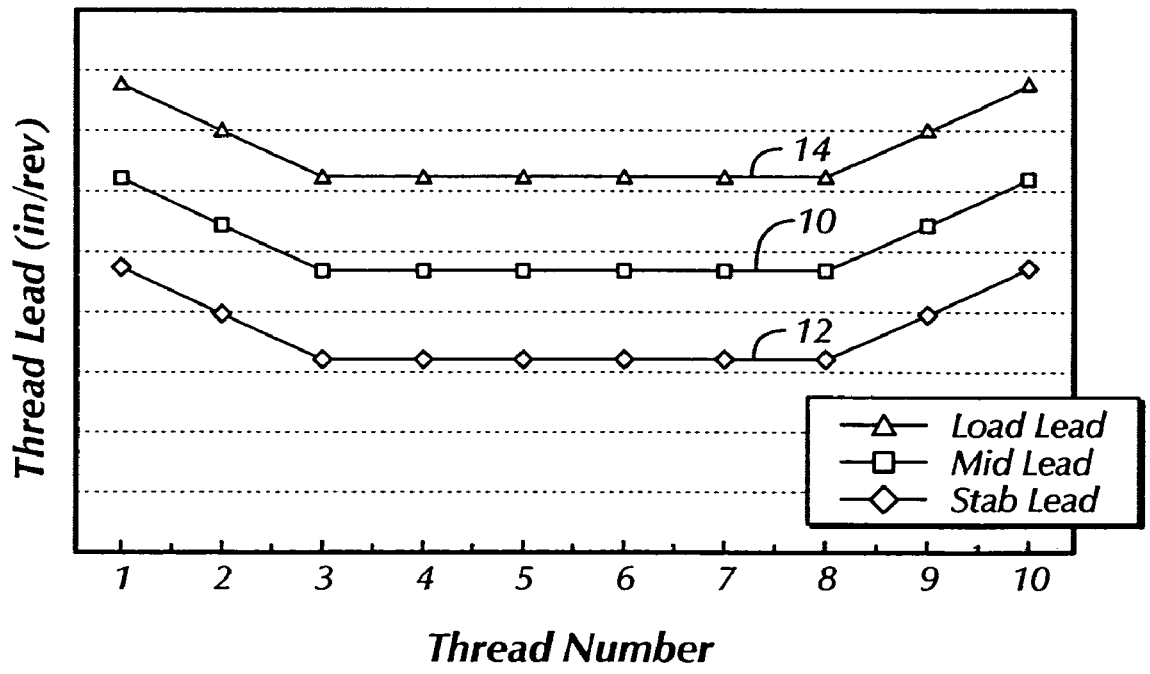
Figure 18:
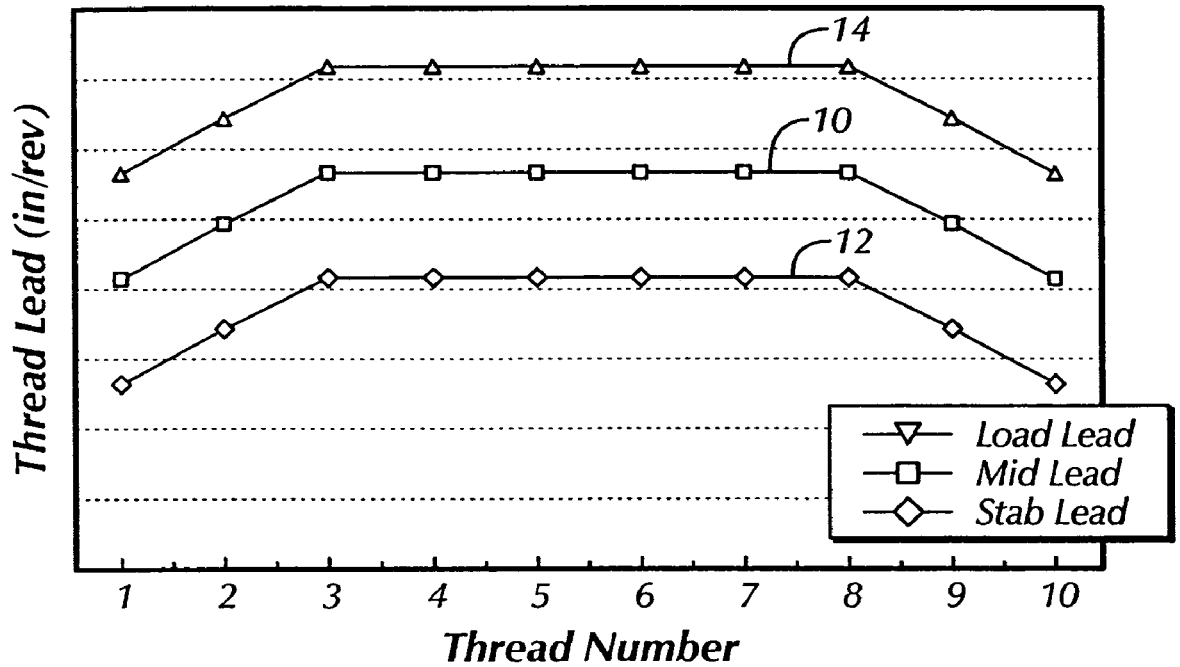

In an embodiment shown in FIG. 17, the stab lead 12 and the load lead 14 are both increased near each end of the threaded connection. An embodiment shown in FIG. 18 has stab lead 12 and load lead 14 which decrease at each end of the threaded connection. As in the previous embodiments, the change in the stab and load leads may be made on either or both the pin and box members.

Figure 19:
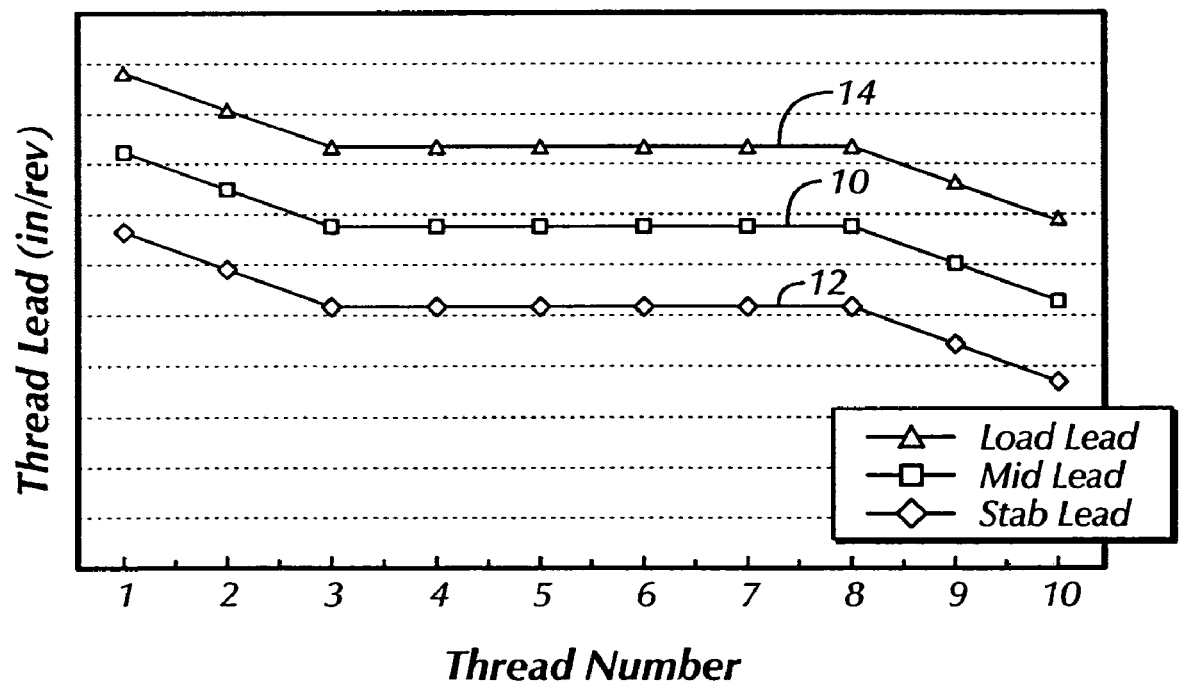
Figure 20:
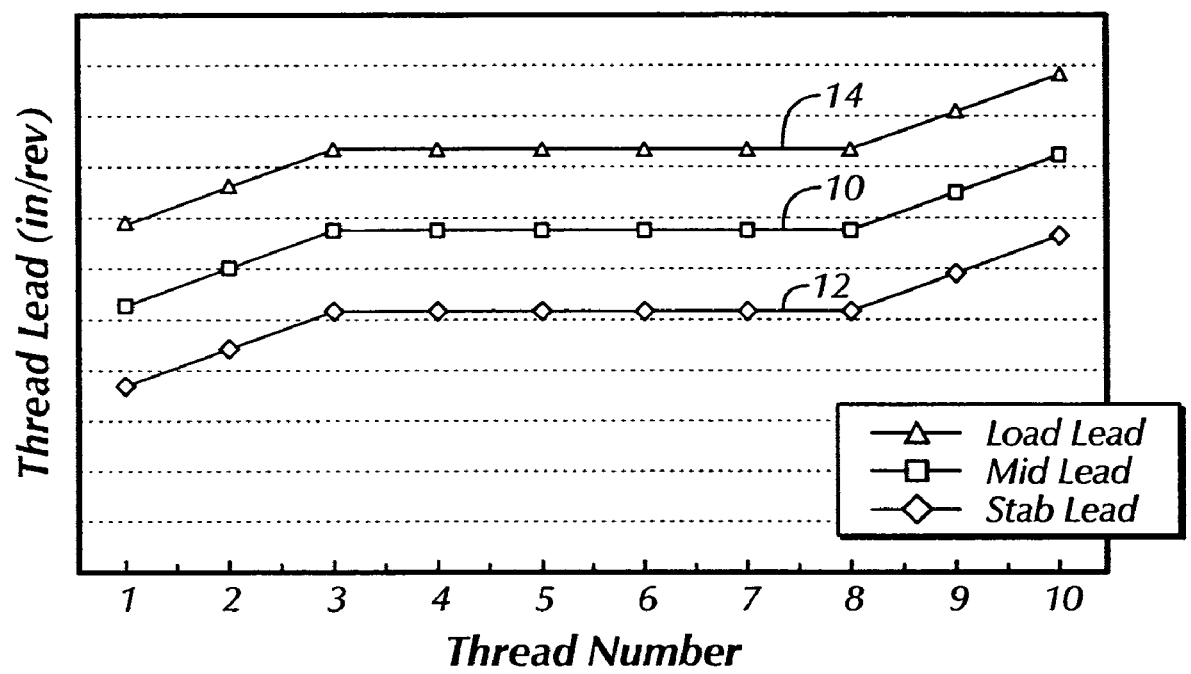

Another variation of the threaded connection is shown in embodiments illustrated graphically in FIGS. 19 and 20. In these embodiments, the stab lead 12 and the load lead 14 are correspondingly increased near one end of the threaded connection, and are correspondingly decreased at the other end. The embodiments of FIGS. 19 and 20 are similar, but have the increase and decrease in the leads 12, 14 at opposite ends of the threaded connection from each other. As in the other embodiments of the connection according to the invention, the change in lead may be made on either or both the pin and box members.

In all of the foregoing embodiments, the change in lead is shown as being about two threads from the associated thread end (open end or thread base) of the threaded member. This value has proven effective for the thread diameter, taper and nominal leads used for the illustrated embodiments. This distance may also be defined as about twice the nominal lead of the threads in the part of the threaded connection where the leads are substantially constant. In other embodiments of a threaded connection according to the invention, the actual axial position at which any lead change is started can be related to factors such as the thread diameter, the taper (rate of change in thread diameter) of the threaded connection, and the type of thread used, among other factors.

The lead changes in the foregoing embodiments are all shown as being linear. Linear changes in lead are relatively easy to manufacture in any threaded connection according to the invention, but it should be understood that some embodiments may include non-linear changes in lead while substantially achieving the benefits of the invention.

Figure 21:
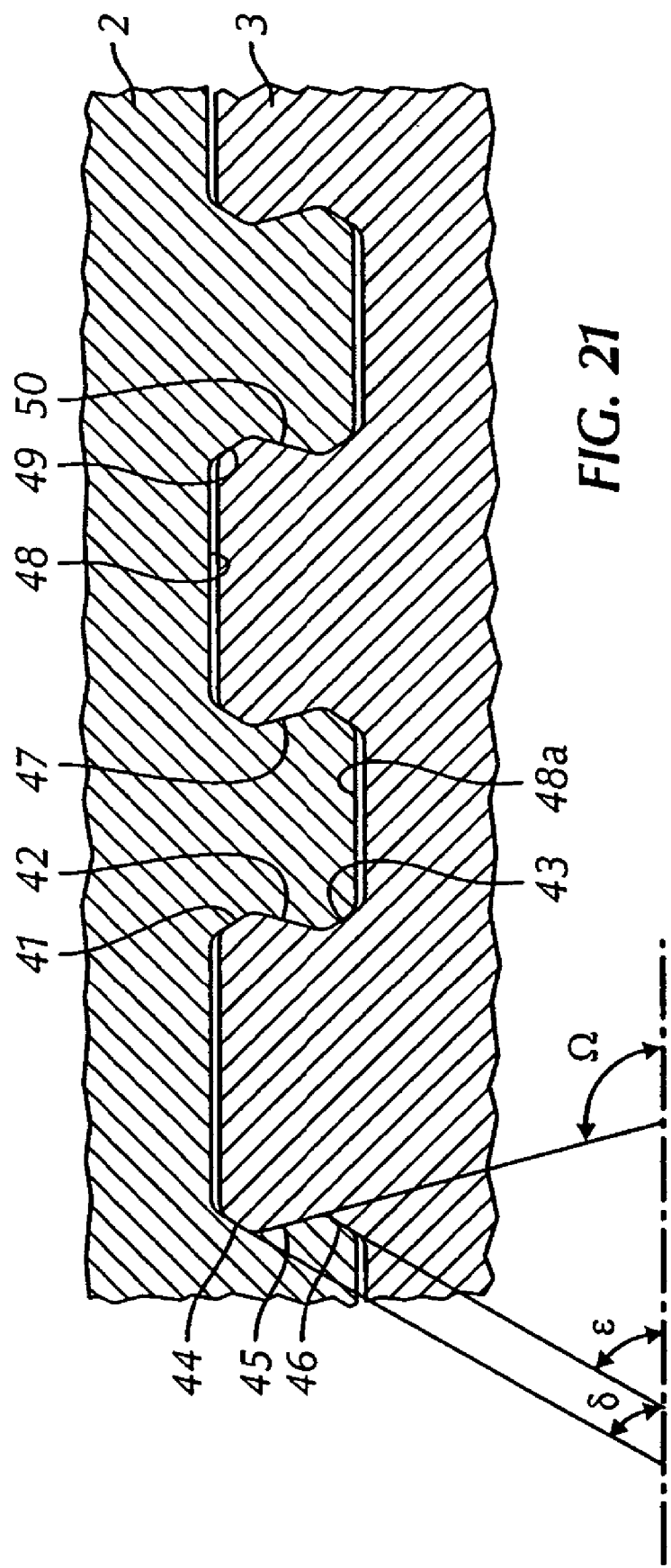
FIG. 21 shows an alternative thread form that can be used with various embodiments of the invention.

The foregoing description of a threaded connection was made with respect to a "dovetail" thread structure such as described in U.S. Pat. No. RE 34,467 issued to Blose. It should be clearly understood that other thread structures can be used in other embodiments of a threaded connection according to the invention. One example of an alternative thread form suitable for use with a connection according to the invention is shown in U.S. Pat. No. 6,254,146 B1 issued to Church. This thread is generally described as a "multi faceted" thread, and is shown in cross section in FIG. 21. The pin 2 includes threads having roots 48, crests 48A, load flanks 47 and stab flanks. The load flanks 47 of the thread includes facets 44, 45, 46 which form respective angles δ, Ω, ε between the face of each facet and the centerline 40 of the pin 2. Corresponding facets 41, 42, 43 may be formed on the stab flanks 50 of the pin thread. The configuration of the flanks 47, 50 on the pin 2 should be matchingly formed on the threads on the box 3. In the thread embodiment of FIG. 21, the threads on the pin 2 and box interlock, while having a root 48 width that can be substantially the same as the crest 48A width.

Figure 22:
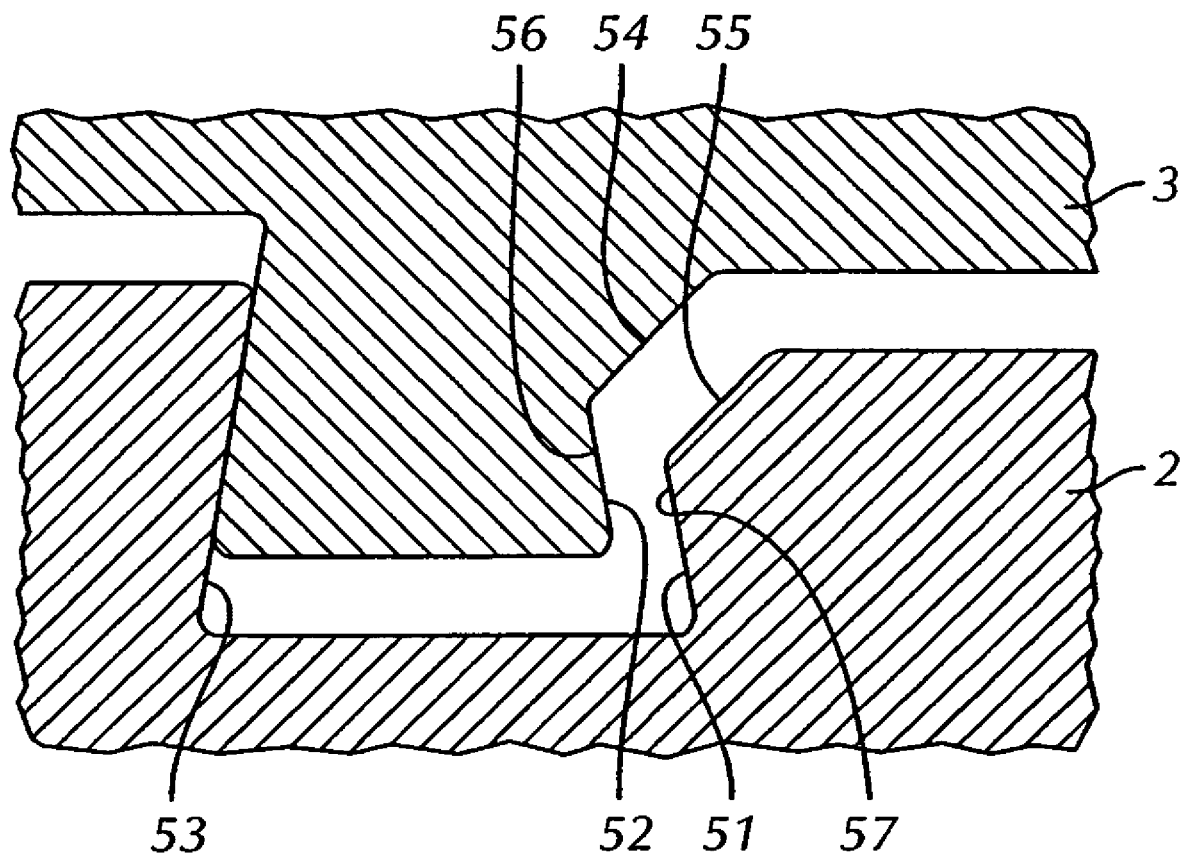
FIG. 22 shows an alternative thread form that can be used with various embodiments of the invention.

Another thread structure which may be used in various embodiments of the invention is similar to a thread structure shown in U.S. Pat. No. 4,600,224 issued to Blose. This thread structure is known as a "chevron" thread, and is shown in FIG. 22. The pin 2 and the box 3 may include stab flanks 53 shaped similarly to conventional "dovetail" threads. The load flanks 51, 52 on the pin 2, and box 3, may include a "dovetail" portion 57, 56, respectively, and a chevron facet 55, 54, respectively.

The two alternative thread forms described above with respect to FIGS. 21 and 22 are not meant to be an exhaustive representation of thread forms which may be used in various embodiments of a threaded connection according to the invention. Other thread forms are described, for example, in published PCT application WO 01/29475 A1 filed by Ramos et al. The thread forms shown in this publication include "square shouldered" thread, which may have the flanks substantially perpendicular to the axis of the connection, or may include angled flanks.

Irrespective of the thread structure used in any embodiment of a connection according to the invention, the common attribute of the threaded connection is that at least part of the threads on the connection include a stab lead which is different from the load lead, and either the stab lead or the load lead, on at least one of the female member (box) or the male member (pin) is changed beginning at a selected distance from an end of the threads.

Various embodiments of the invention can provide a threaded connection which is stronger, after radial plastic expansion of conduit sections connected thereby, than the threaded connections previously known in the art.

The foregoing description of a threaded connection according to various embodiments of the invention was made in terms of a threaded connection particularly suitable for radially plastically expandable conduit. It has also been determined that a threaded connection made according to the invention can improve the capacity of a threaded connection to withstand tensile stress and/or compressive stress along the longitudinal axis of the conduit. Some embodiments may have increased capacity to withstand torque loading. Differential lead threaded connections of the prior art are designed so that contact stresses between engaged threads are substantially evenly distributed, both along the helical length of the threads, and between the stab and load flanks upon "make up" of the threaded connection. The foregoing description of various embodiments of the invention is made in terms of threaded connections that can have more evenly distributed contact stresses after radial plastic expansion of the threaded connection. As will be further explained, embodiments of a threaded connection according to the invention can also provide more even distribution of contact stresses under compressive and/or tensile loads after make up of the threaded connection. Other embodiments may have better capacity to withstand torque loading. In this application of a threaded connection according to the invention, the connection does not have to be radially plastically expanded to obtain the benefit of the invention.

In order to more fully appreciate this particular application of a threaded connection according to the invention, it is helpful to understand certain characteristics of threads made according to various embodiments of the invention. For example, referring once again to FIG. 3 a threaded member which has its load lead and its stab lead converging toward the nominal lead (such as shown between engaged threads 8 to 10 in FIG. 3) can be said to have thread which becomes "thicker" in the direction of the lead convergence. Conversely, referring once again to FIG. 4, where the load lead 14 and stab lead 12 diverge toward one end of the connection, the thread can be said to become "thinner."

Referring once again to FIG. 17, when both the load and stab leads increase, and in particular by like amounts, the thread can be said to be "stretched out", whereby spacing between threads increases (nominal lead increases). Conversely, referring again to FIG. 18, as the load and stab leads decrease correspondingly, the thread can be said to be "pulling in."

It has been determined that a threaded connection in which at least one of the load lead and the stab lead, at least one end of either the male member or the female member, is varied starting at a selected distance from the end of the thread, can have improved ability to withstand compressive stress and tensile stress along the longitudinal axis of the threaded connection, as well as, in some embodiments, resist fatigue and torque.

Having explained the general concept of this application of the invention, particularly advantageous embodiments related to this application will now be explained.

Figure 23:
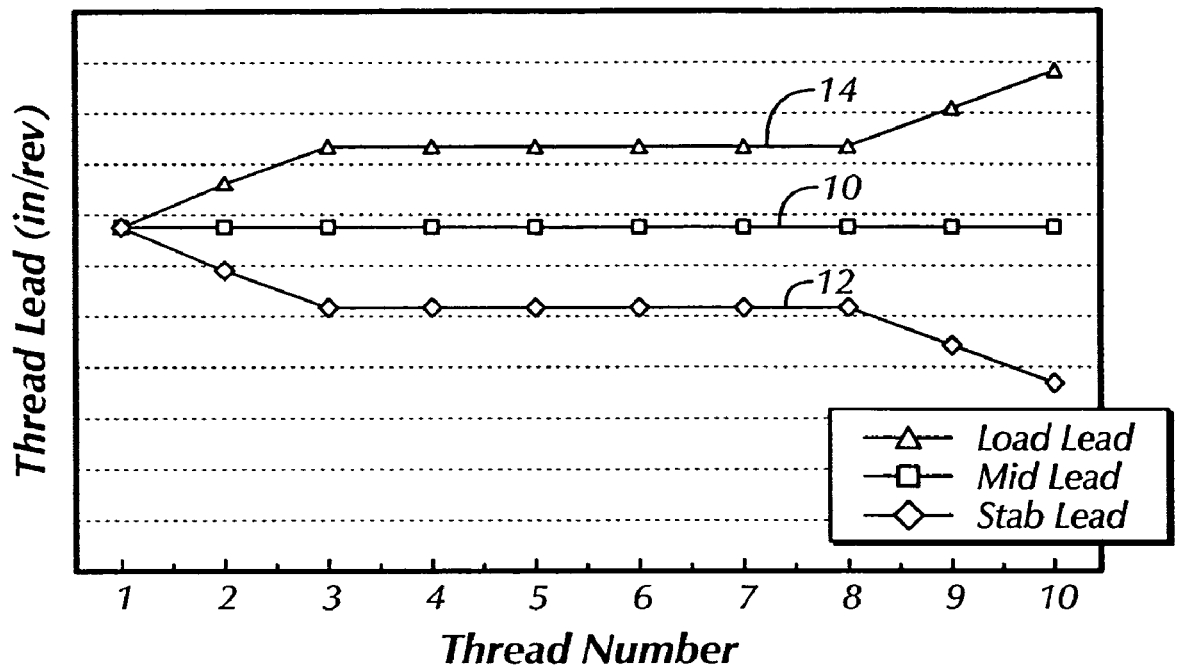
FIG. 23 shows an embodiment of the invention which may have increased capacity to withstand tensile stress.

In a conventional threaded connection, if the sum of the shear area (cross-sectional area of the thread root) is less than or equal to the sum of the thread flank area, such a connection is considered to be "shear weak." In one embodiment of a threaded connection according to this application of the invention, the thread is made thinner on both the pin and box members near the first engaged thread. The thread is also made thicker near the last engaged thread on both the pin (male) and box (female) members. FIG. 23 shows change in load lead 14 and in stab lead 14 with respect to position along the thread length for this embodiment. The embodiment of FIG. 23 may have better ability to withstand tensile loading than prior art threaded connections, because the shear stresses are more evenly distributed along the connection.

Figure 24:
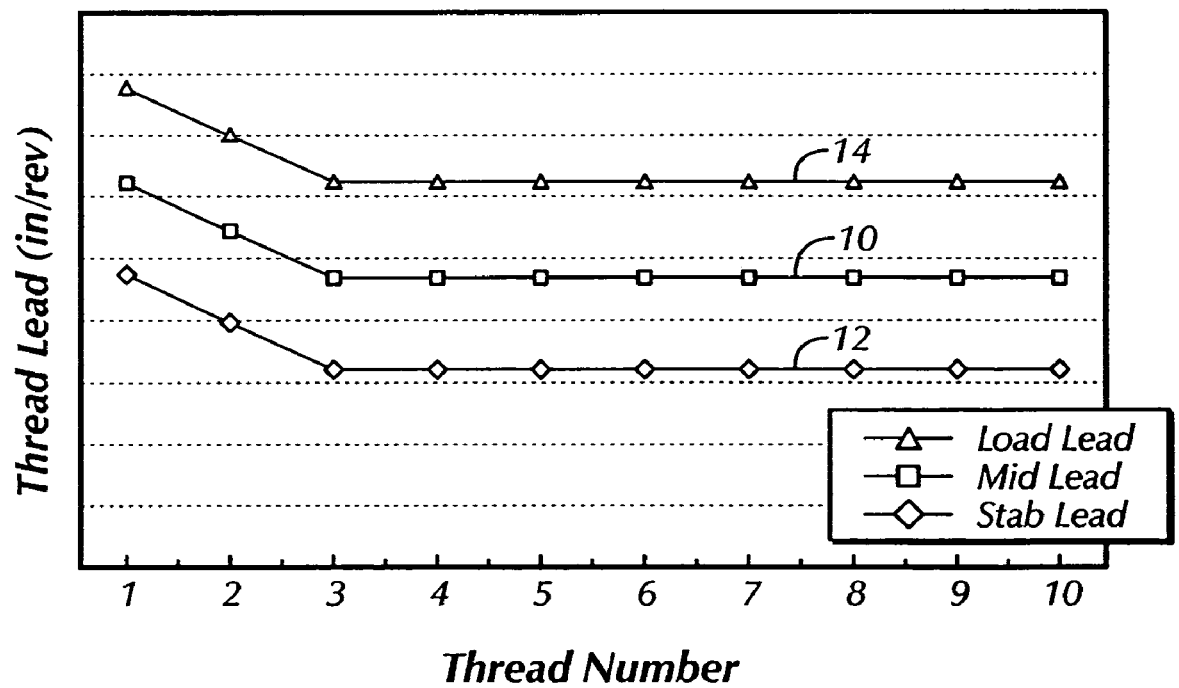
FIG. 24 shows an embodiment of the invention which may have increased capacity to withstand compressive stress.

Another embodiment of a threaded connection according to the invention is shown in FIG. 24. This embodiment includes increasing the stab lead 12 and load lead 14 near the first engaged thread on both the pin member and box member. This embodiment may have increased capacity to withstand compressive loading.

Figure 25A:
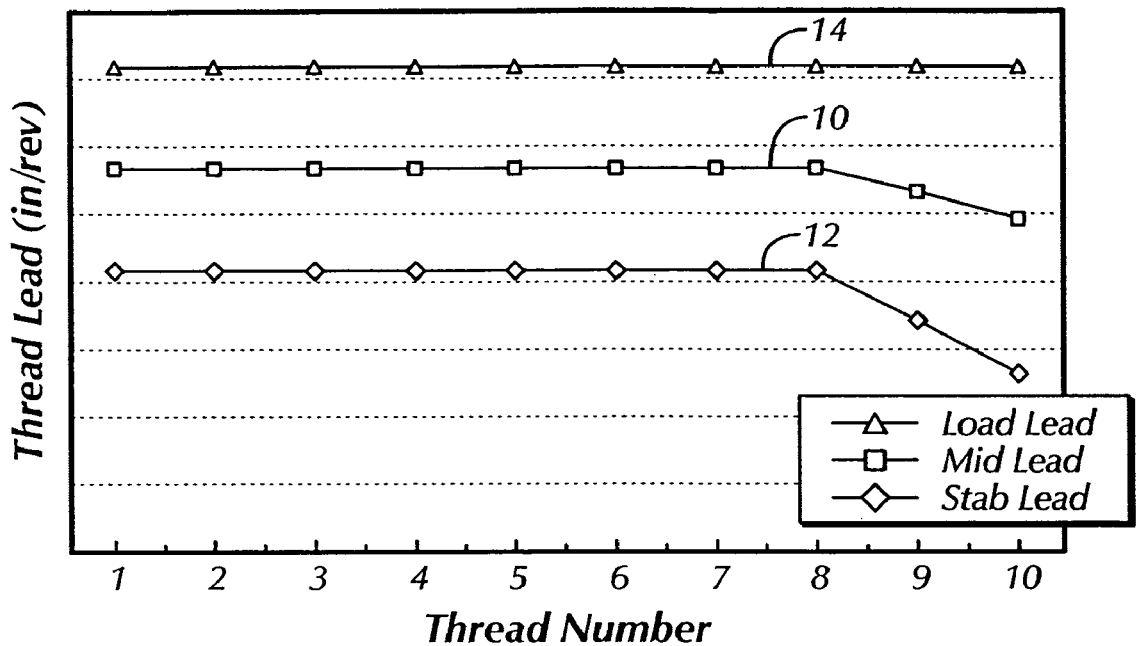
FIGS. 25A and 25B show an embodiment of the invention which may have increased capacity to withstand torque and fatigue.
Figure 25B:
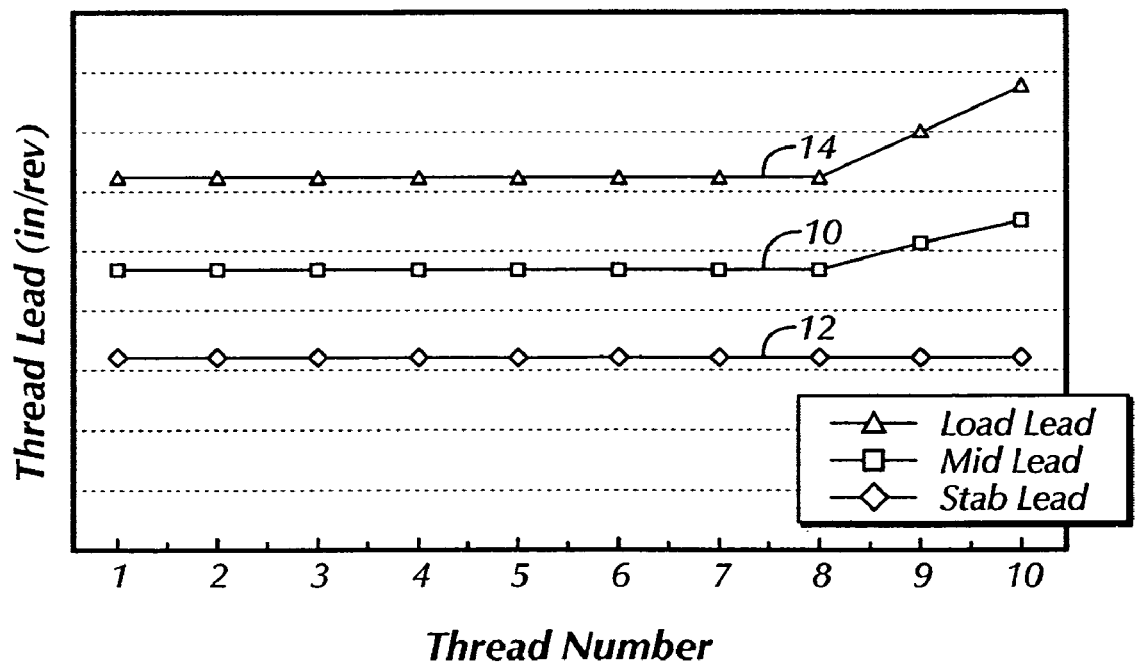

Yet another embodiment of a threaded connection according to the invention may have improved capacity to withstand torque loading and tension-induced fatigue (resulting from repeated application of tensile stress). This embodiment includes, on the male member, reducing the stab lead near the last engaged thread (thread base of the pin). This is shown in FIG. 25A. On the female member, the load lead is increased near the last engaged thread (thread base of the box). This is shown graphically in FIG. 25B. This embodiment may have better capacity to resist cyclic compression/decompression induced fatigue.

In each of these embodiments, the change in thread lead which begins at the selected distance from the end of the thread is shown as being linear. As in the other embodiments, the lead change can be other than linear. Furthermore, and also as previously explained, the selected distance may be some amount other than the two threads shown in the embodiments of FIGS. 23, 24, 25A and 25B.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A threaded connection for a radially, plastically expandable conduit, comprising:
    a male member having threads thereon defining a load flank lead, a nominal lead and a stab flank lead;
    a female member having threads thereon adapted to mate with the threads on the male member, the threads on the female end defining a load flank lead, a nominal lead and a stab flank lead, the load flank lead and the stab flank lead on the female member and the male member changed at a predetermined rate beginning at a selected distance from each end of the threads, the stab flank lead and the load flank lead being different from each other over at least part of a thread length, and
    wherein the change in lead is linear.

2. The threaded connection as defined in claim 1 wherein the selected distance is about two threads.

3. A threaded connection, comprising:
    a male member configured to mate with a female member, the male member comprising external threads corresponding to internal threads of the female member; the external threads comprising a load flank lead and a stab flank lead;
    the internal threads comprising a load flank lead and a stab flank lead;
    wherein the load flank leads of the external and internal threads change at a first rate beginning a selected distance from both ends of the threaded connection;
    wherein the stab flank leads of the external and internal threads change at a second rate beginning a selected distance from both ends of the threaded connection, and
    wherein the first and second rates are linear rate changes.

4. The threaded connection of claim 3, wherein the first and second rates are the same.

* * * * *

UNITED STATES PATENT AND TRADEMARK OFFICE
CERTIFICATE OF CORRECTION

| | | |
|---|---|---|
| PATENT NO. | : 7,469,938 B2 | Page 1 of 1 |
| APPLICATION NO. | : 11/201865 | |
| DATED | : December 30, 2008 | |
| INVENTOR(S) | : Robert S. Sivley, IV et al. | |

It is certified that error appears in the above-identified patent and that said Letters Patent is hereby corrected as shown below:

On the Title Page, Item (54) Title, line 2, the word "Radically" should be

--Radially--.

Signed and Sealed this

Tenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,469,938 B2                                              Page 1 of 1
APPLICATION NO.    : 11/201865
DATED              : December 30, 2008
INVENTOR(S)        : Robert S. Sivley, IV et al.

It is certified that error appears in the above-identified patent and that said Letters Patent is hereby corrected as shown below:

On the Title Page, Item (54) Title, line 2, and Column 1, line 2, the word "Radically" should be --Radially--.

This certificate supersedes the Certificate of Correction issued March 10, 2009.

Signed and Sealed this

Thirty-first Day of March, 2009

JOHN DOLL
*Acting Director of the United States Patent and Trademark Office*